United States Patent [19]
Komori et al.

[11] Patent Number: 5,392,442
[45] Date of Patent: Feb. 21, 1995

[54] DATA-DRIVEN PROCESSOR HAVING AN OUTPUT UNIT FOR PROVIDING ONLY OPERAND DATA IN A PREDETERMINED ORDER

[75] Inventors: Shinji Komori; Hidehiro Takata; Toshiyuki Tamura; Fumiyasu Asai, all of Itami; Takeshi Fukuhara, Amagasaki, all of Japan

[73] Assignee: Mitsubishi Denki Kabushiki Kaisha, Tokyo, Japan

[21] Appl. No.: 837,128

[22] Filed: Feb. 19, 1992

Related U.S. Application Data

[63] Continuation of Ser. No. 471,864, Jan. 26, 1990, Pat. No. 5,117,489.

[51] Int. Cl.$^6$ ............................................. G06F 9/06
[52] U.S. Cl. ....................... 395/800; 364/232.22; 364/241.8; 364/255.5; 395/375
[58] Field of Search .............. 395/375, 425, 800, 400; 370/85.4

[56] References Cited

U.S. PATENT DOCUMENTS

| | | |
|---|---|---|
| 3,978,452 | 8/1976 | Barton et al. . |
| 4,145,733 | 3/1979 | Misunas et al. . |
| 4,153,932 | 5/1979 | Dennis et al. . |
| 4,327,407 | 4/1982 | Burrows . |
| 4,511,958 | 4/1985 | Funk .................... 395/325 |
| 4,591,979 | 5/1986 | Iwashita . |
| 4,751,638 | 6/1988 | Azuma . |
| 4,774,706 | 9/1988 | Adams ................... 370/94 |
| 4,775,927 | 10/1988 | Hester et al. . |
| 4,777,595 | 10/1988 | Strecker et al. ............ 395/200 |
| 4,881,196 | 11/1989 | Ternda et al. . |
| 4,896,258 | 1/1990 | Yamaguchi et al. . |
| 4,943,916 | 7/1990 | Asano et al. . |
| 4,953,082 | 8/1990 | Nomura et al. . |
| 4,972,315 | 11/1990 | Yamasaki et al. ............ 395/400 |
| 5,016,169 | 5/1991 | Koya et al. . |

OTHER PUBLICATIONS

"A Data Flow Processor Aimins at the Image Processing Field," Matsumoto et al., Nikkei Electronics, No. 340, pp. 181–218, 1984.
"Structure Holdlins in Data-Flow Systems," Gaudlot, IEEE Transactions on Computers, vol. C-55, No. 6, Jun. '86.

*Primary Examiner*—Parshotam S. Lall
*Assistant Examiner*—Krisna Lin
*Attorney, Agent, or Firm*—Townsend and Townsend Khourie and Crew

[57] ABSTRACT

A data-driven processor which has a packet assembling unit to add a tag information to the sequentially inputted data when the input data has no tag information, such as destination address or the like, thereby enabling the data to be inputted without using an external circuit, such as a host processor, and improving the data input rate and which also has a packet outputting and rearranging unit for rearranging an output packet stream in a predetermined order to thereby output the data information only, so that it is possible that the data is outputted without any external circuit, such as a host processor, the output rate is improved, and the data output is executed in a predetermined order.

9 Claims, 12 Drawing Sheets

Fig. 2 (f)

|   | 205 FTA | 212 ID' | 206 SEL | REST |
|---|---|---|---|---|
| 0 |  |  |  |  |
| 1 |  |  |  |  |
| 2 |  |  |  |  |
| ... |  |  |  |  |
| 127 |  |  |  |  |

|   | 207 MMA | 208 OPC | REST |
|---|---|---|---|
| 0 |  |  |  |
| 1 |  |  |  |
| ... |  |  |  |
| 63 |  |  |  |

|   | 230 DATA |
|---|---|
| 0 |  |
| 1 |  |
| ... |  |
| SII |  |

16

Fig. 12 (a)
(A2, B2, C2) 2nd GENERATION
(A1, B1, C1) 1st GENERATION
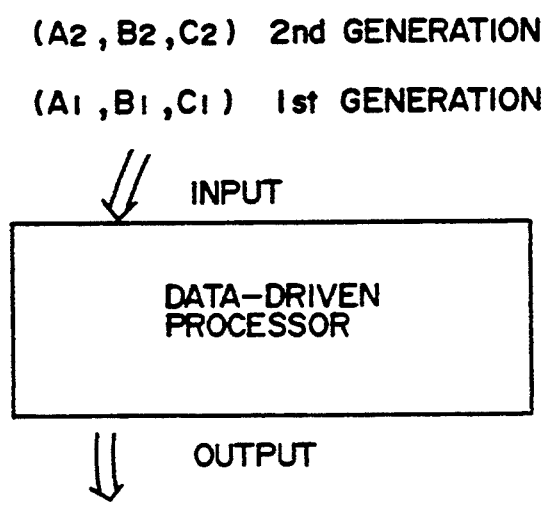
(X2, Y2) 2nd GENERATION
(X1, Y1) 1st GENERATION
Fig. 12 (b)
X = A x B
Y = A x B + C
Fig. 12 (c)
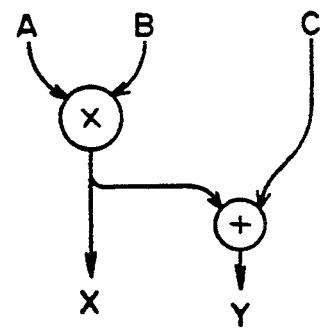

DATA-DRIVEN PROCESSOR HAVING AN OUTPUT UNIT FOR PROVIDING ONLY OPERAND DATA IN A PREDETERMINED ORDER

This is a continuation of application Ser. No. 07/471,684, filed Jan. 26, 1990, now U.S. Pat. No. 5,117,489.

BACKGROUND OF THE INVENTION

1. Field of the Invention

This invention relates to a data-driven processor, and more particularly to a data-driven processor which can easily process packets including only untagged data without the so-called tag information, such as the module number and the destination address, and output the packet only of a data field in a predetermined order.

2. Description of the Prior Art

The data-driven processor is also called the data flow processor and is a computer which basically executes a data-driven principle that "whenever pairs of data required for processing are complete, the processing may be executed".

Conventionally, this kind of information processor has been cited on the thesis of a data flow processor aiming at the image processing field (Matsumoto et al., Nikkei Electronics No. 340, pp. 181-218, Apr. 9, 1984). Next, explanation is given on the conventional example on the basis of the thesis:

FIG. 1 is a block diagram of the above-mentioned data-driven microprocessor, in which a reference numeral 1 designates an input control unit, 8 designates an output control unit, 2 designates a link table unit, 3 designates a function table unit, 4 designates a matching memory unit, 5 designates a queuing unit, 6 designates an operation unit, and 7 designates an output queuing unit.

FIG. 2 shows change in form of the format of the packets and the content of each table used in the processor shown in FIG. 1. In FIGS. 2-(a) through (e), reference numerals 9 through 13 designate packets respectively. At the packet 9, a reference numeral 101 designates module number MN, 102 designates a destination addresses (ID), and 103 designates data. At the packet 11, a reference numeral 112 designates the next destination address (ID'), 105 designates a function table address (FTA), and 106 designates a selection code (SEL). At the packet 12, a reference numeral 107 designates the matching memory address (MMA), and 108 designates an operational code (OPC). At the packet 13, reference numerals 131 and 132 designate first and second data respectively.

In FIGS. 2-(f) through (h), reference numerals 14 to 16 designate a link table (LT), a function table (FT) and a matching memory (MM) respectively, and 0 to 127, 0 to 63 and 0 to 511 designate their own addresses respectively. At the link table 14, a reference numeral 205 designates a function table address, 212 designates the next destination address, and 206 designates a selection code. At the function table 15, a reference numeral 207 designates a matching memory address, and 208 designates an operational code. At the matching memory 16, a reference numeral 230 designates data.

Next an explanation of the operation of the conventional data-driven processor follows:

The packet 9 shown in FIG. 2-(a) is introduced into the information processor constructed as shown in FIG. 1. The module number (MN) 101 at the packet 9 having reached the input control unit 1 is compared with a module number previously given to the information processor, so that, when not coincident, the packet is sent as it is to the output control unit 8 and outputted to the exterior. Otherwise, packet 10 except for the module number (NN) 101 (see FIG. 2-(b)) is sent to the link table 2 only when coincident.

The link table unit 2 uses the destination address (ID) 102 at the packet 10 as the address and its link table 14 is referred. As a result, and the function table address (FTA) 205 for reading out the function table (FT) 15, the next destination address (ID') 212 for reading out the link table 4 when the packet 10 reaches the link table unit 2, and the selection code (SEL) 206 representing sorting of instruction to be given to the packets, are read out and added to the packet 10, thereby forming a new packet 11 (see FIG. 2-(c)) and outputting it to the function table unit 3.

The function table unit 3 uses the function table address (FTA) 105 as the address and refers to its function table (FT) 15, thereby obtaining the parameter group which determines the processing content at the following pipeline stage. A part of the obtained parameters is added directly to the packet 11 as it is and other parts are reprocessed at a control unit (not shown) so that the result is added to the packet 11 so as to form a new packet 12 and then sent to the matching memory unit 4.

For example, the packet 11 received by the function table unit 3 is the packet serving as one operand of 2-operand operation, and, when the packet serving as the other operand is assumed to have already reached and wait at the matching memory unit 4, the packet 11 at the function table 3 obtains the operational code (OPC) 208 representing the sort of operation and the memory address (MMA) 207 of the matching memory (MM) 16 storing therein other operands of the 2-operand operation and adds them to the packet 11, thereby forming the packet 12 (see FIG. 2(d)).

The matching memory unit 4 reads out the data corresponding to other operands necessary to execute operation and transmits the data as the packet 13 (see FIG. 2-(e)) provided with 2-operands 131 and 132 to the queuing unit 5.

The queuing unit 5 comprises a first-in first-out memory so that, when the packet 13 reaches the head of first-in and first-out memory, it is outputted to the operation unit 6 and operation processing is executed. The packet 10 from the operation result is of a format shown in FIG. 2-(6b) and to be outputted to the link table unit 2.

Thus, the input packet circulates several times through a pipe line ring 50 comprising the link table unit 2, function table unit 3, matching memory unit 4, queuing unit 5 and operation unit 6, thereby being subjected to required processing. Thereafter, the packet is sent to the function table 3 through the link table unit 2 for the re-outputting, receives an instruction for the output, is sent to the output queuing unit 7 via the matching memory unit 4 and queuing unit 5, and is outputted to the exterior through the output control unit 8.

However, in the processing method described at the conventional example, it is required that the data packet to be processed, when introduced from the exterior, includes the so-called tag information, such as the module number and the destination address along with data. Also, the data of the processing result is outputted with such tag information being added. Moreover, since a data-driven type computer does not assure the desired order of executing instructions, the data is not always output in the desired order.

Therefore, the problems occur in that
(1) in comparison with the input of data only, the number of pins required for the input/output of a packet including data and tag information increases, or, if one packet should be divided into a plurality of words for a smaller number of input/output lines the input/output rate lowers,
(2) an external device or a host processor is required to add the destination address or the like to the data so as to build up the input packet, and
(3) since the output order of output packets is not generally predetermined, the external device or the host processor is required which decides the destination address of the output packet and rearranges the output packet stream in the predetermined order.

SUMMARY OF THE INVENTION

In the light of the above circumstances, the present invention has been designed.

A first object of the invention is to provide a data-driven processor which is adapted to process with ease an untagged including only data, thereby improving the input/output rate.

A second object of the invention is to provide a data-driven processor which requires no external device and host processor for adding the tag information to data so as to form the input packet.

A third object of the invention is to provide a data-driven processor which requires no external device and host processor for rearranging the output sequence of output packets in a predetermined order.

The data-driven processor of this invention is provided with; a packet assembling unit which adds a tag information to data having no tag information and being sequentially introduced from the exterior and which assembles packets; an instruction storage unit which stores therein processings to be executed with respect to the data information of said packet assembled by said packet assembling unit; and an operation unit for processing the data information of said packet in accordance with the instruction stored in said instruction storage unit.

The above and further objects and features of the invention will more fully be apparent from the following detailed description with accompanying drawings.

DESCRIPTION OF THE PREFERRED EMBODIMENT

Next, an embodiment of the data-driven processor of the invention is described in accordance with the drawings.

Figure 1:
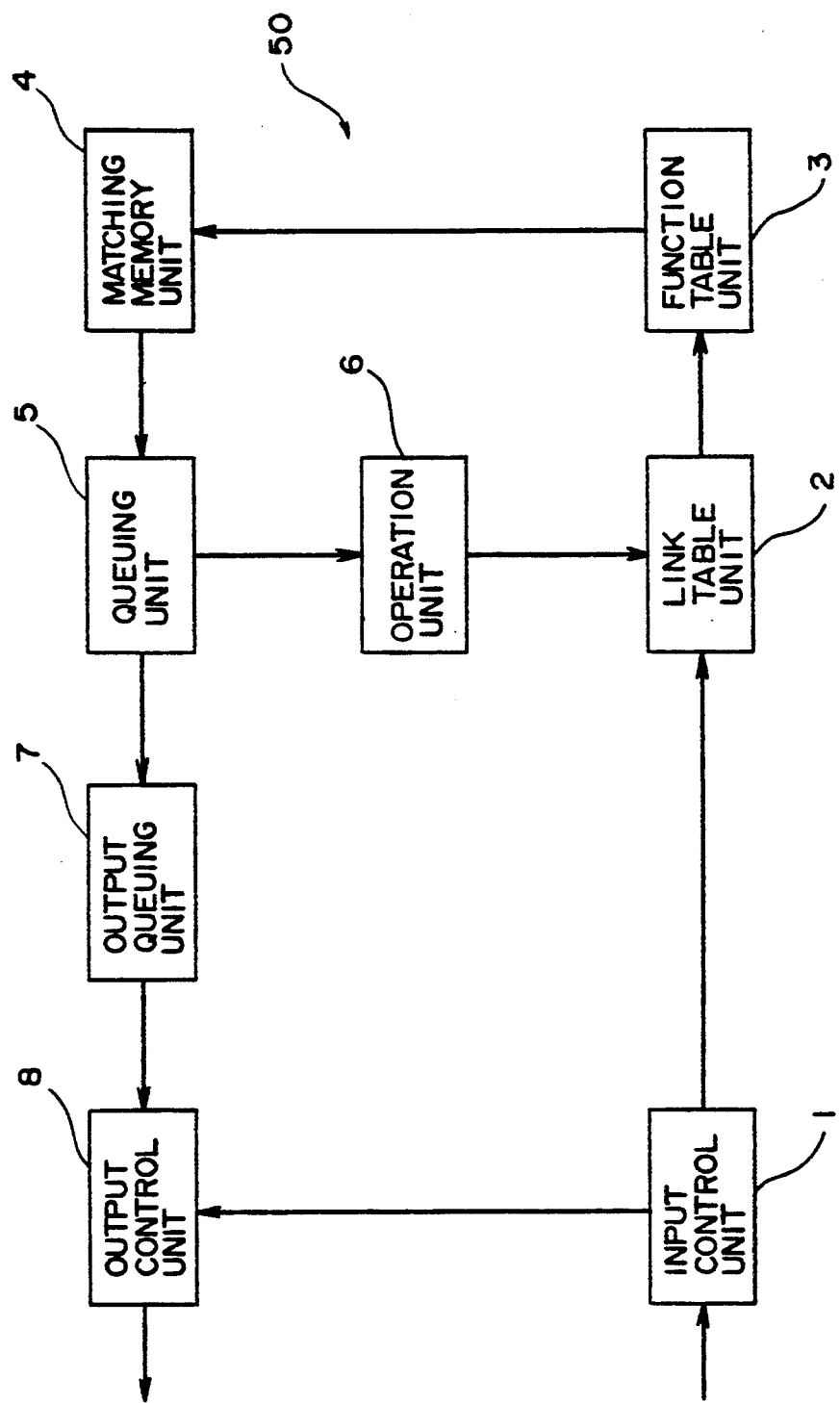
FIG. 1 is a block diagram of an example of the conventional data-driven processor.
Figure 3:
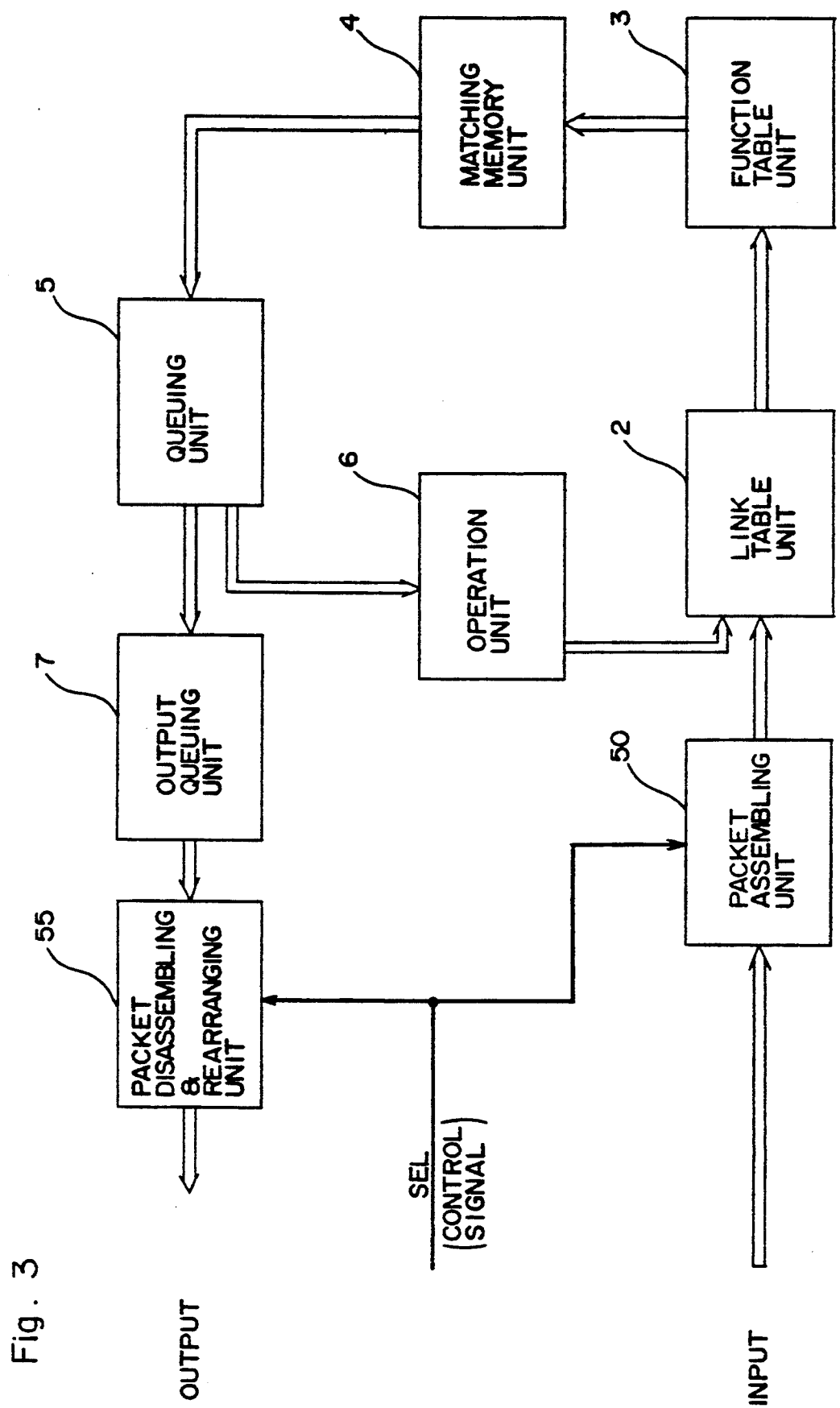
FIG. 3 is a block diagram of an embodiment of a data-driven processor of the invention.

FIG. 3 is a block diagram of an embodiment of the data-driven processor of the invention, in which a fundamental block diagram of the processor is the same as that of the conventional example shown in FIG. 1 and comprises a link table unit 2 as an instruction storage unit, a function table unit 3, a matching memory unit 4, and an operation unit 6. It is different from the conventional example in that at an input field of a processing demand packet is provided to a packet assembling unit 50 and at an output field of the result packet is provided to a packet disassembling and rearranging unit 55, and with an input terminal for a control signal SEL for selecting the operation modes of the two functional blocks.

Figure 2:
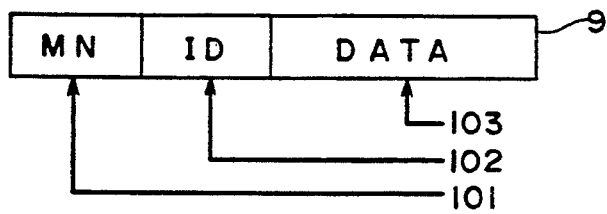
FIGS. 2(a), 2(b), 2(c), 2(d), 2(e), 2(f), 2(g) and 2(h) are view exemplary of formats and tables of packets used for the conventional data-driven processor shown in FIG. 1.
Figure 2:
Figure 2:
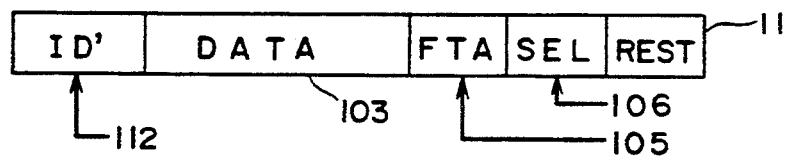
Figure 2:
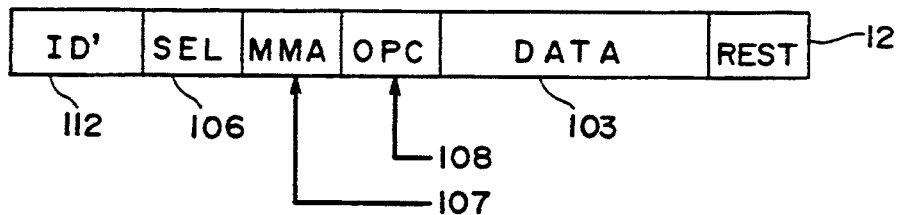
Figure 2:
Figures 2F, 2G, 2H:
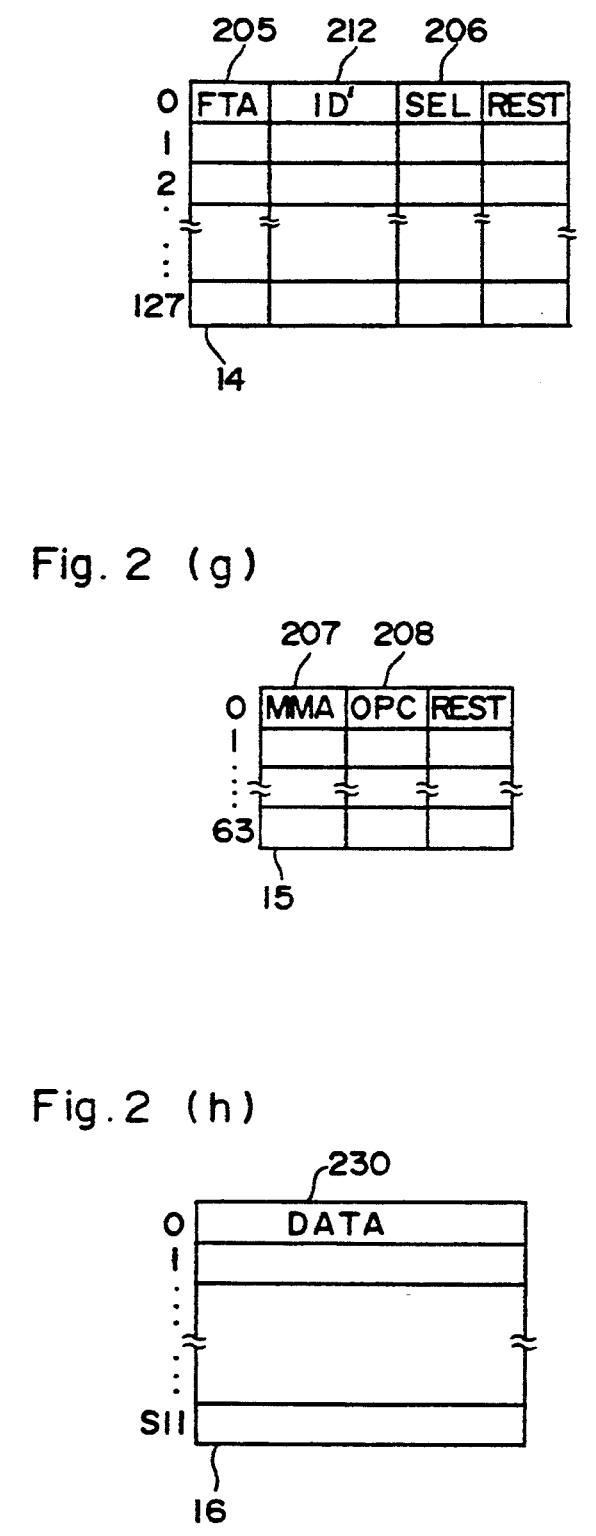

The control signal SEL is a signal serving to select the format of input/output packet so that, when SEL=0, a tag block (ID) and a data block (DATA) in two words as shown in FIG. 2-(b) are sequentially input-output, and when SEL=1, only the data field of one word is sequentially input-output. In other words, the processor controls the data processing in the same way as the conventional example when SEL=0, and the data processing without the tag when SEL=1.

Figure 8:
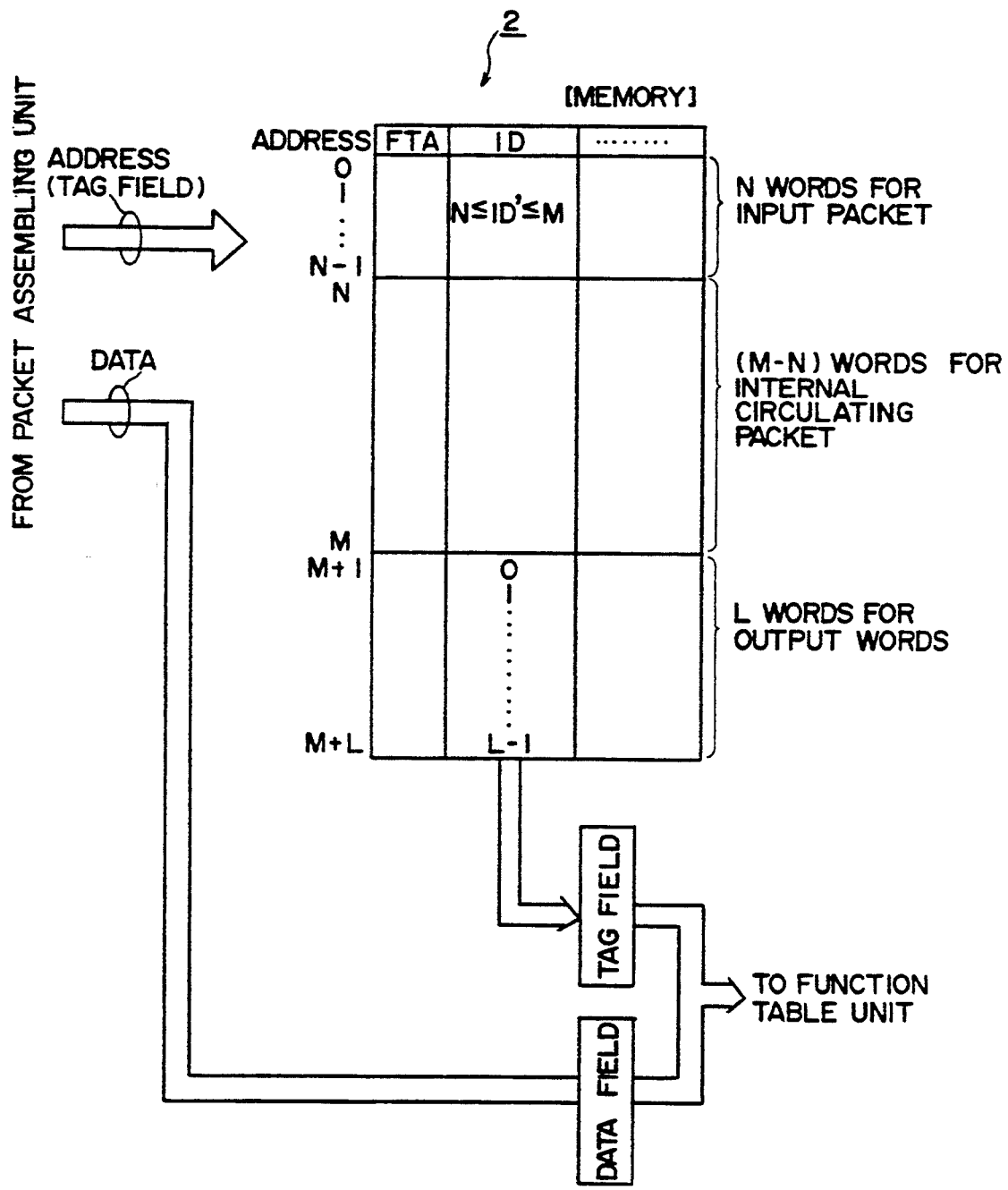
FIG. 8 is a view exemplary of part of internal structure of a link table unit of the data-driven processor of the invention, FIG. 9-(a) is a block diagram exemplary of structure of a handshaking data transfer control circuit being included in the structures shown in FIGS. 5 and 6, FIG. 9-(b) is a timing chart of operation of the handshaking data transfer control circuit, FIG. 10-(a) is a logical circuit diagram exemplary of structure of a double frequency circuit of the packet disassembling and assembling unit of the packet shown in FIG. 4, FIG. 10-(b) is a timing chart of operation of the double circuit, FIGS. 11-(a) and -(b) are logical circuits of structures of delay circuits used in the respective units of the data-driven processor of the invention, FIG. 12-(a) is a typical view of the relation of input/output for the data-driven processor of the invention, FIG. 12-(b) is a view exemplary of formulas executed by the data-driven processor of the invention, and FIG. 12-(c) is a data flow program of the formulas shown in FIG. 12-(b).

Next, explanation is given to basic operation when SEL signal is a logical "1". In accordance with FIG. 3, in which the data is introduced sequentially to the packet assembling unit 50 from the exterior, the data is ID-numbered, starting from 0 in the order received. This ID-number is added as tag information and the packet comprising the tag and data fields is output to the link table unit 2. The link table unit 2, as shown in FIG. 8, reads out FTA, ID' and the like to update the tag fields at the packet, thereby enabling the processing of the data.

Thereafter, the packet is subjected to cyclic pipeline processing comprising the function table unit 3, matching memory unit 4, queuing unit 5, operation unit 6 and link table unit 2 so that when the predetermined processing described in the program is finished, the packet is outputted to the packet disassembling and rearranging unit 55 through output queuing unit 7.

The packet disassembling and rearranging unit 55 rearranges the arriving packet in the order of ID numbers, thereby enabling the untagged input data field to be outputted to the exterior in accordance with the predetermined order specified by magnitude of the ID number added to the data.

Now, explanation is given on an input/output relation of the data with respect to the data-driven processor of the present invention. FIGS. 12-(b) and -(c) show the formulas exemplary of the program to be executed and a data flow graph thereof. Also, FIG. 12-(a) shows that output packets (Xi, Yi) (i=1, 2, ...) introduced in a time series manner. In FIG. 12-(a), the generation number is for distinguishing the set of data arriving in a time series manner from other sets. In this embodiment, the number of input packets per one generation is three and that of output packets in two. In this embodiment, the data within one generation is assumed to be introduced inevitably in the predetermined order (for example, the order of Ai, Bi and Ci). In other words, this embodiment is based on the consideration that the continuous input data are divided into the data number per one generation and the input data in the generation is tagged (supplied with an ID number) in the order received, thereby enabling the data processing to be executed without contradiction.

Next, operations of the packet assembling unit, link table unit and packet disassembling and rearranging unit is detailed mainly of a case where the SEL signal is a logical "1" and the data processing is carried out upon untagged data without tag.

Figure 4:
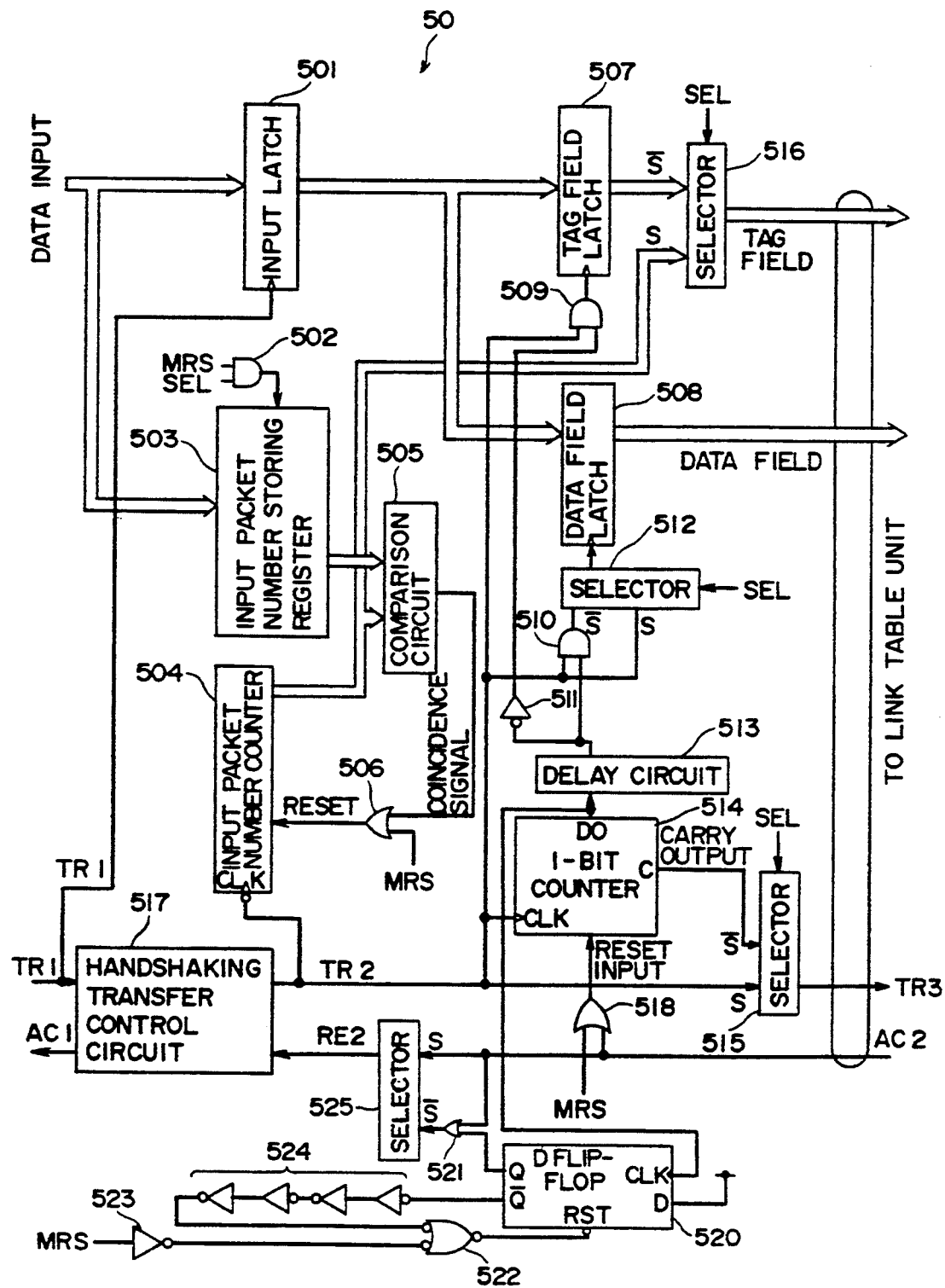
FIG. 4 is a block diagram exemplary of structure of a packet assembling unit in the embodiment of the invention in FIG. 3.

At first, the internal construction and operation of the packet assembling unit 50 is described in accordance with FIG. 4. The packet assembling unit 50, as shown, comprises an input latch 501, a tag field latch 507, a data field latch 508, an input packet number storing register 503, an input packet number counter 504, a comparison circuit 505, selectors 512, 515, 516 and 525, a delay circuit 513, a one-bit counter 514, a handshaking transfer control circuit 517, a D flip flop 520 and gates 502, 506, 509, 510, 511, 518, 521, 522, 523 and 524.

Firstly, the input packet number per one generation is stored in the register 503. When a master reset signal (MRS) and the SEL signal introduced into an AND gate 502 are both logical "1", the register 503 loads the data given to an input data terminal thereof and then is initialized. Also, when the master reset signal (MRS) introduced into the input packet number counter 594 and one-bit counter 514 becomes a logical "1", the respective counters are initialized.

In this state, the data together with a transfer request signal TR1, when introduced, is latched by the input latch 501 every time. When the handshaking transfer control circuit 517 receives the transfer request signal TR1, an acknowledge signal AC1 is generated and a transfer request signal TR2 to the next stage rises. Hence, the selector 512 selects a right side input (S), whereby the data field latch 508 latches the data, and since the selector 516 selects a lower input (S), the output of input packet number counter 504 is outputted as the tag field through the selector 516.

On the other hand, since the selector 515 selects a lower input (S), a transfer request signal TR3 rises every time the data is introduced. When the receipt signal HE2 with respect to the transfer request signal TR3 is returned through selector 525, TR2 falls and is introduced as the clock into the input packet number counter 504 and the counted value is incremented by one. Thus, every time one packet is transferred to the link table unit 2, the counted values are incremented. When the value reaches an input number for one generation, since the comparison circuit 505 is given the value of register 503, a coincidence signal "1" is outputted and given to the counter 504 through the gate 506, the input packet number counter 504 is reset to thereby start processing with respect to the next generation.

As above mentioned, when the number of input data per one generation is, ID numbers from 0 to $N-1$ are automatically added to the input data tag fields and transmitted to the link table unit 2.

Figure 9:
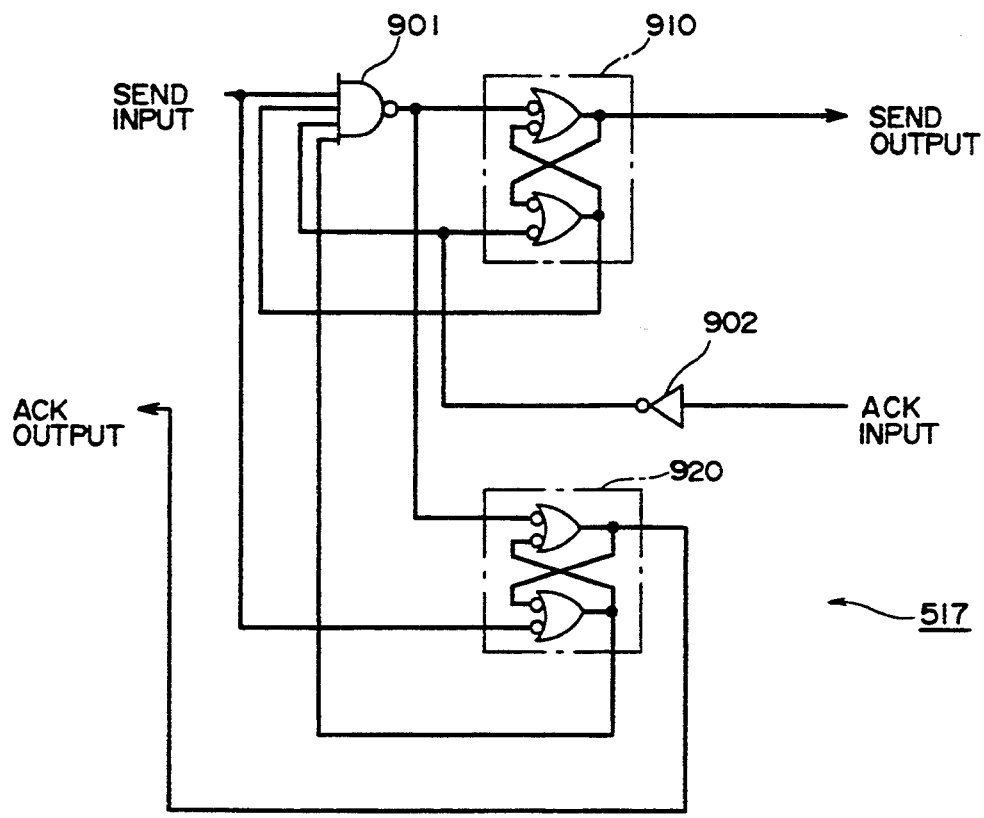
Figure 9:
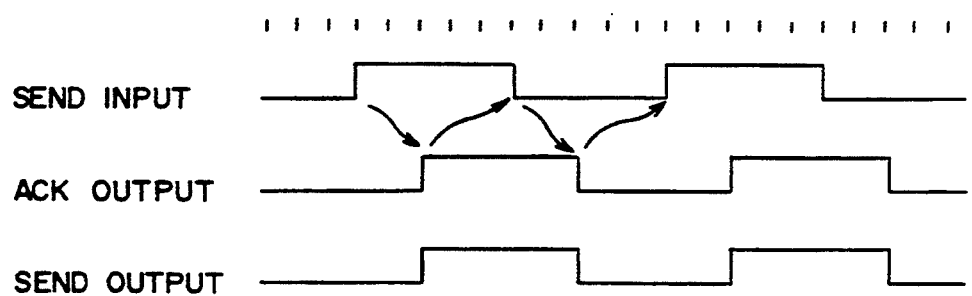

In this case, the handshaking transfer control circuit 517, as shown in FIG. 9-(a), comprises a logical circuit of a NAND gate 901, an inverter 902 and set-reset (SR) flip-flops 910 and 920, and, as shown in the timing chart in FIG. 9-(b), is a control circuit for receiving the send input (transfer request signal TR1) to output a send output (TR2) to the next stage. The control circuit becomes a complete handshaking implementation circuit to execute the sequence of four cycle operation;
 (1) a rising of the transfer request signal,
 (2) a rising of the receipt signal corresponding thereto,
 (3) a falling of the transfer request signal corresponding to the rising of acknowledge signal, and
 (4) a falling of the acknowledge signal corresponding thereto.

In FIG. 4, when the SEL signal is a logical "0", the control circuit 50 twice receives the data from the data input terminal, so that a first data is controlled to be latched at the tag field latch 507, a second data to be latched to the data field latch 508, and a carry output of the one-bit counter 514 is used as a transfer request signal TR3 for the next stage, whereby the tag field and data field are controlled to be alternately introduced and then sent to the link table unit 2. Therefore, the receipt signal RE2 for the second transfer request signal TR2 is generated by one-shot pulse generating circuit. The one-shot pulse generating circuit is composed of D flip flop 520 and delay elements 524, and the receipt signal RE2 for the second transfer request signal TR2 is generated by the hand shaking transfer control circuit of next stage.

Next, explanation is given on the link table unit 2, which is of the same construction as the conventional example, but is as shown in FIG. 8, characterized in that
 (1) the address region of memory is divided into three sections for the input packet $200^1$, internal circulation packet $200^2$ and output packet respectively.
 (2) the address region $200^1$ for each input packet (of N-number per each generation) is set from 0 to $N-1$, and
 (3) the ID' field at each output packet region $200^2$ is set from 0 to $L-1$ where the number of words in each output packet is L. Such setting is easily implemented when the program is compiled.

Figure 5:
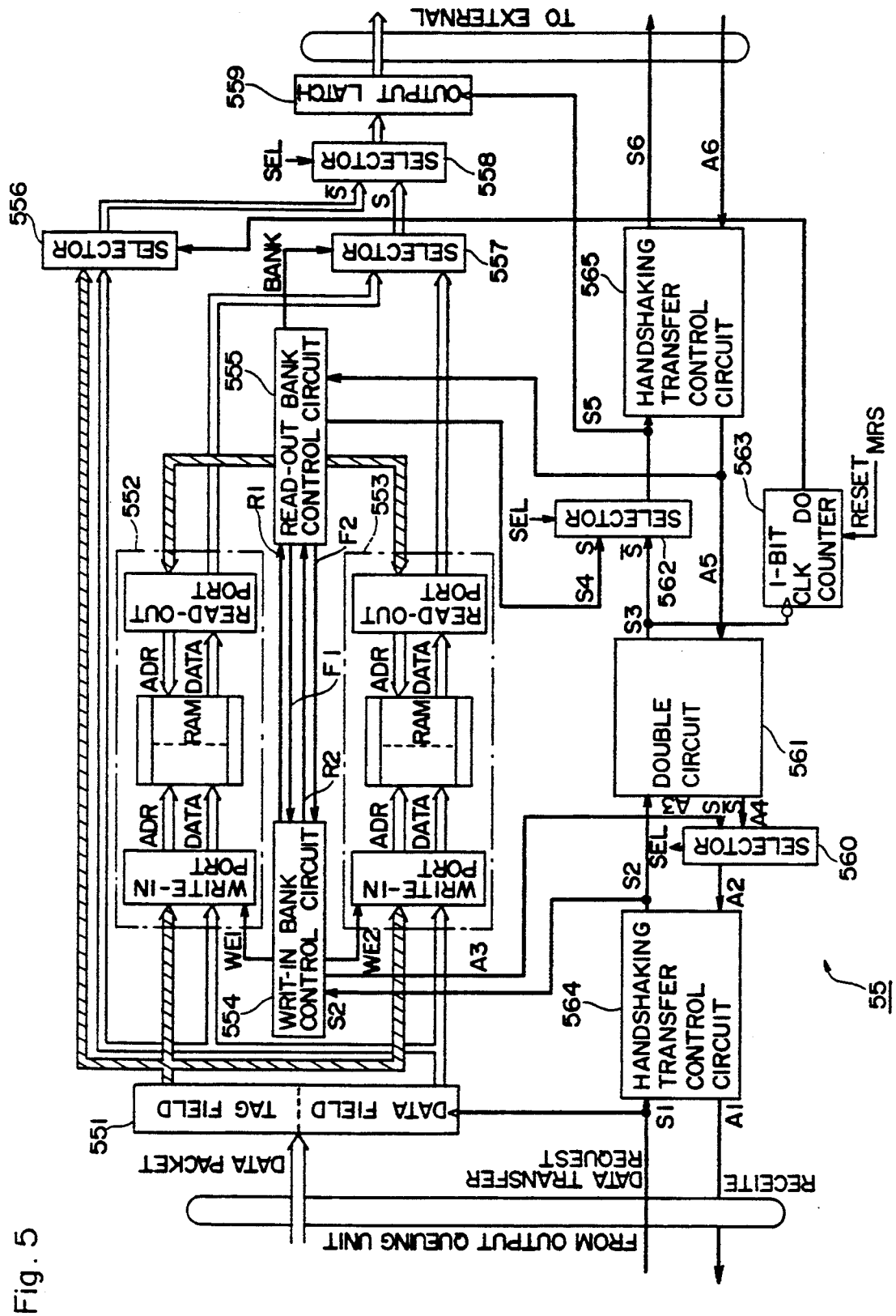
FIG. 5 is a block diagram exemplary of structure of a packet disassembling and rearranging unit of the data-driven processor of the invention.

Next, explanation is given on the internal construction and operation of the packet disassembling and rearranging unit 55 in accordance with FIG. 5, the unit 55, as shown, comprising a data latch 551, first and second rearranging two-port RAM banks 552 and 553, write-in and read-out bank control circuits 554 and 555, an output latch 559, selectors 556 through 558, 560 and 562, a double circuit 561, a one-bit counter 563, and handshaking transfer control circuits 564 and 565.

At first, when the SEL signal is a "1", the packet having arrived from the output queuing unit 7 is latched by the data latch 551 and thereafter is written its data field into the first or second two-port RAM banks 552 or 553 using the ID number (tag field) as the write address. At that time the bank is selected by the write-in bank control circuit 554, with the first and second banks being alternately used to expect an improvement in an output throughput.

For example, when L (the number of output packets per one generation) are completely written in the first bank 552, the write-in bank control circuit 554 gives a read-out enable signal R1 to the read-out bank control circuit 555 to be discussed below. While the first bank 552 is being read-out, it is possible to write in the data into the second bank 553. Meanwhile, the read-out bank control circuit 555 continuously reads out L data elements from the address 0, thereby enabling the data to be read in the predetermined order. When the read-out of the first bank 552 is finished, a read-out finish signal F1 is given to the write-in bank control circuit 554. Hence, at the write-in bank control circuit 554, the first bank 552 is empty, whereby it is detected that the same bank is reuseable.

As seen from the above, the packet disassembling and rearranging unit 55 operate to remove the tag by disassembling the packet and rearranging the data in a predetermined order in the two-port RAM.

On the other hand, when the SEL signal is a logical "0", the selector 558 selects the upper input $\bar{S}$. The selector 556, which outputs this data, alternately outputs the tag field and data field of the result data packet having arrived from the output queuing unit 7, resulting in that the tag field and data field are automatically alternately outputted to the exterior, and at this time the rearrangement in the predetermined order is not carried out. Also, at this time, since two data should be outputted every time one packet arrives, the double circuit 561 to be discussed below is provided on the route from the data transmission request signal S2 to that S3.

In addition, the constructions and operations of the handshaking transfer control circuits 564 and 565 are basically same as those shown in FIG. 9.

Figure 10:
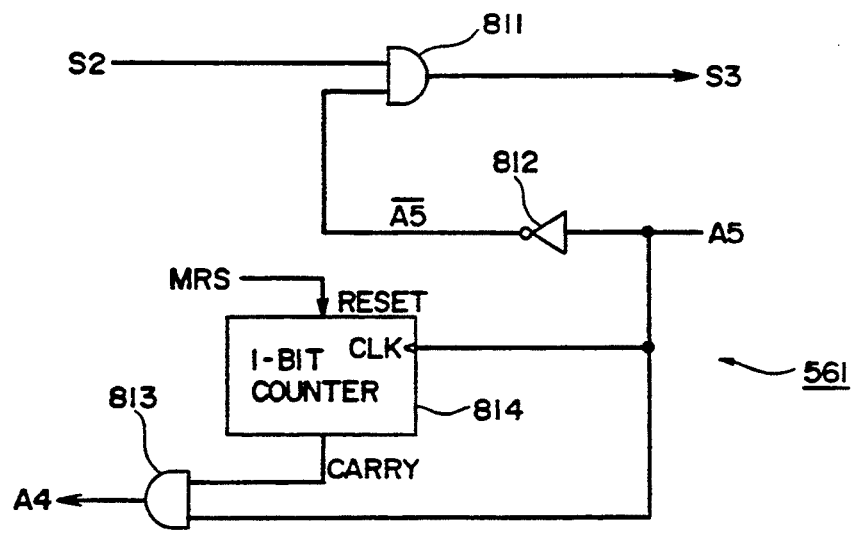
Figure 10:
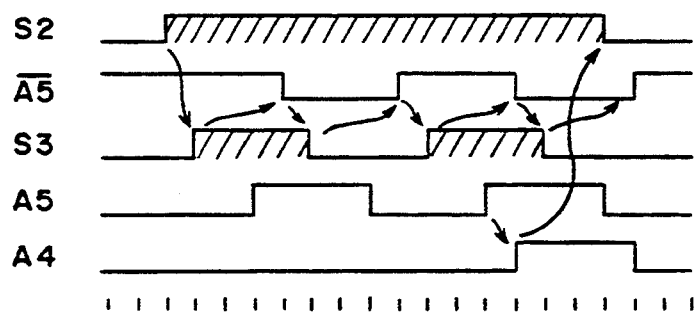

The double circuit 561 as shown in FIG. 10-(a), comprises logical circuits 811 to 813 and a one-bit counter 814. The timing chart of operation of outputting one transmission request signal pulse S3 is shown in FIG. 10-(b).

Figure 6:
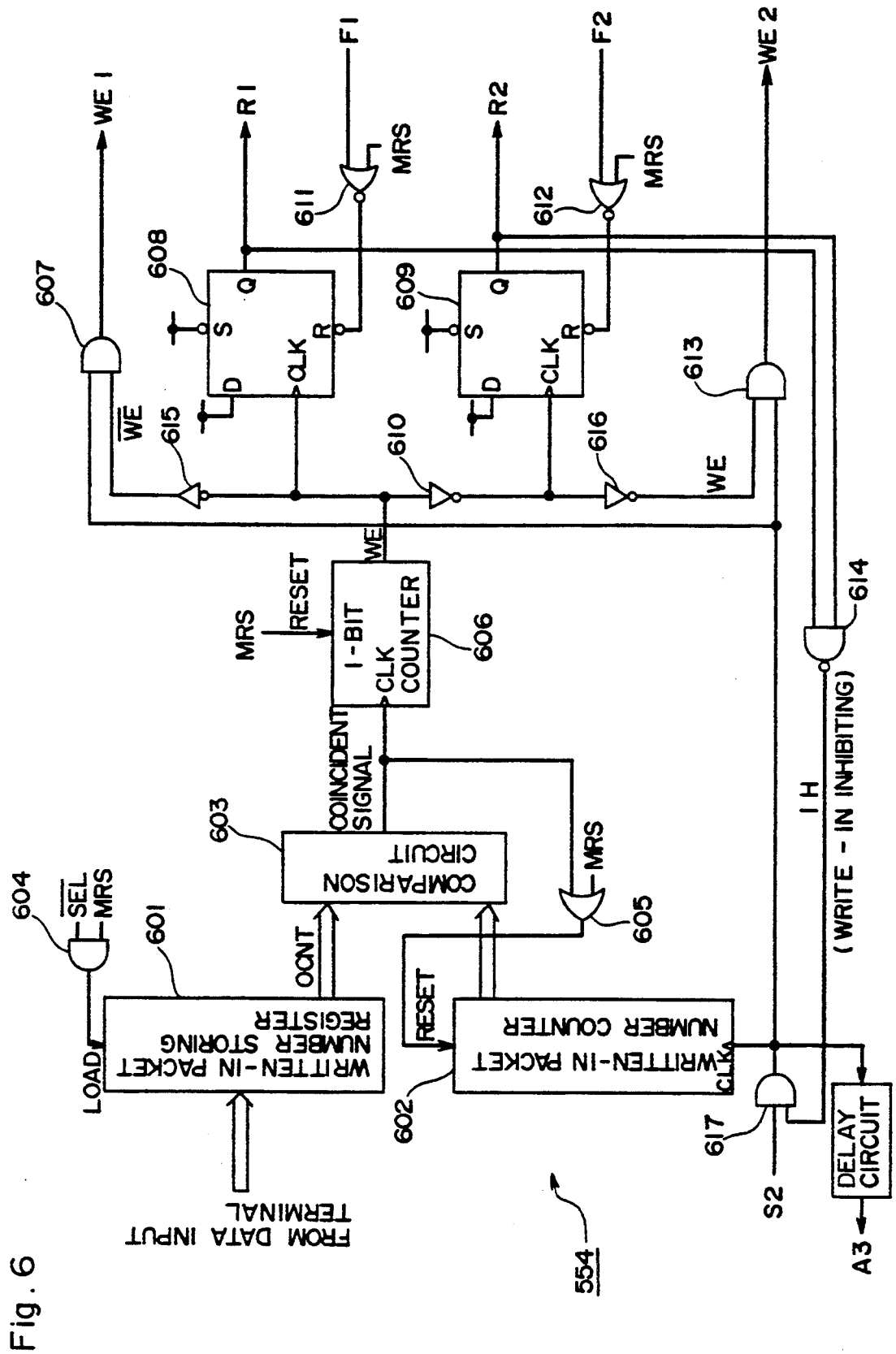
FIG. 6 is a block diagram exemplary of structure of a write-in bank control circuit of the data-driven processor of the invention.

Next, the write-in bank control circuit 554 shown in FIG. 5 is further detailed in accordance with FIG. 6, which, as shown in FIG. 6, comprises a written-in packet number storing register 601, a written-in packet number counter 602, a comparison circuit 603, a one-bit counter 606, D-flip-flops 608 and 609, a delay circuit and gates 604, 605, 607 and 610 to 617.

At the initialization stage, the number (for example, L) of output packets per generation are given to the data input terminal and the SEL signal is kept at a logical "0" and the master reset signal (MRS) at that "1", whereby the value L is loaded on the write-in packet number storing register 601. Also, the master reset signal (MRS) is kept at a logical "1", thereby resetting the write-in packet number counter 602, one-bit counter 606, and D-flip-flops 608 and 609.

In the initialization state, since an output $\overline{WE}$ of one-bit counter 606 is a logical "0", its inverted output $\overline{WE}$ is a logical 1, so that each time the transmission request signal S2 (the same as S2 shown in FIG. 5) is a logical "1", the output WE1 (the same as WE1 shown in FIG. 5) of the AND gate 607 becomes a logical "1", thereby writing the ID number (tag field) as the address in a rearranging port RAM at the first bank 552. Thus, when write in of the predetermined number (for example, L) is finished, the content of the write-in packet number storing register 601 and the output of the write-in packet number counter 602 are both L, whereby a coincidence signal of a logical "1" is outputted from the comparison circuit 603, a clock is introduced to the one-bit counter 606 to invert WE from "0" to "1", a trigger signal is introduced into the D-flip-flop 608 to vary the read-out enable signal R1 at the first bank 552 into a logical "1", and simultaneously the write-in packet number counter 602 is reset. In other words, (1) the first bank 552 is at the read enable state,
(2) the second bank 553 is at the write enable state, and simultaneously
(3) the write-in packet number counter 602 starts to count the write-in packet number with respect to the second bank 553.

Meanwhile, when read out of the first bank 553 is finished, the D-flip-flop 603 receives the finish signal F1 and its output R1 returns to a logical "0". However, write-in of the second bank 553 is finished before the read-out of the first bank 552 is finished, the further write-in needs be restrained. At this time, since R1 and R2 are both a logical "1", the two-input NAND gate 614 given R1 and R2 detects the above state, and a low active write-in inhibiting signal IH is given to the two-input AND gate 617 so as to restrict the transmission request signal 52. Of course, when the read-out of the first bank 552 is finished, R1 changes to a logical "0", whereby immediately the first bank 552 starts write-in to the first bank 552.

Figure 7:
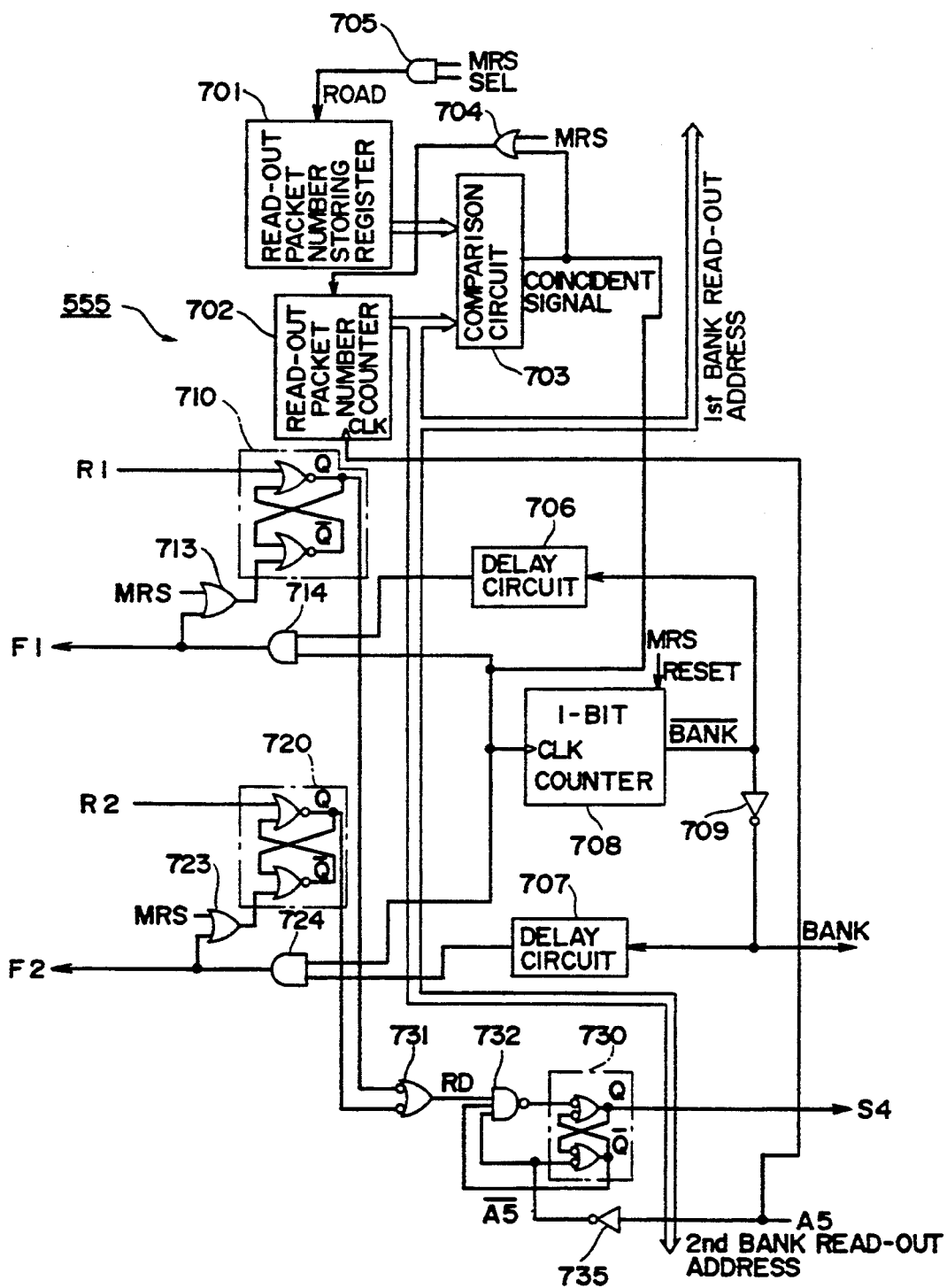
FIG. 7 is a block diagram exemplary of structure of a read-out bank control circuit of the data-driven processor of the invention.

Next, explanation is given according to FIG. 7 on the read-out bank control circuit 555 shown in FIG. 5.

The read-out bank control circuit 555, as shown in FIG. 7, comprises a read-out packet number storing register 701, a read-out packet number counter 702, a comparison circuit 703, a delay circuits 706 and 707, a one-bit counter 708, flip-flops 710, 720 and 730 and gates 704, 705, 709, 713, 714, 723, 724, 731, 732 and 735.

The number (for example, L) of read-out packets is controlled by use of the read-out packet number storing register 701, read-out packet number counter 702 and comparison circuit 703, which is quite same as control (see FIG. 6) at the write-in bank control circuit 554, thereby omitting the description of control and initial operation of the control.

The selection of the read-out bank is controlled by an inverted signal $\overline{BANK}$ of an output signal BANK (the same signal as the signal BANK in FIG. 5) of the one-bit counter 708. In this embodiment, for simplification of structure, both the banks are adapted to be read out simultaneously, so that either one of the two read-out data is selected by the BANK signal (refer to FIG. 5). Accordingly, the read-out address is the output of the read-out packet number counter 702 and common to both the banks.

In the initial state, the first bank 552 is selected, and at this time, when the read-out enable signal R1 changes to a logical "1", the Q-output of the SR flip-flop 710 changes to a logical "0", thereby inverting the output RD of two-input NOR gate 731 into a logical "1". In this initial state, two other inputs of the three-input NAND gate 732 are both logical "1", whereby RD is inverted to a logical "1" to set the SR flip-flop 730 and S4 becomes a logical "1". When the read-out signal A5 ("1") returns corresponding to S4, the read-out packet number counter 702 is incremented and simultaneously the SR flip-flop 730 is reset.

Thus, when the predetermined number (for example, L) of output data are read out continuously from the first bank 552, the coincidence signal output of the comparison circuit 703 is a logical "1" and the inputs of the two-input AND gate 714 are both "1", so that when the first bank read-out finish signal F1 of the output of the AND gate 714 becomes a logical "1", and simultaneously the output of two-input NOR gate 713 becomes a logical "1", the SR flip-flop 710 is set. Also, the output of the one-bit counter 708 is inverted following the above setting to result in that the second bank 553 is read out.

It should be noted that a change in the output of one-bit counter 708 is brought into the two-input AND gates 714 and 724 through the delay circuits 706 and 707, so that the two-input AND gate, which outputs the read-out finish signal corresponding to the coincidence signal, is the gate which had been selected when the coincidence signal occurred (in the above description, it is the two-input AND gate 714 at the first bank 554 side).

As a result of such read-out, in a case where both the banks have no data, the inputs of the two-input NOR gate 731 are both "1", whereby the output thereof is a logical "0". In order to fix the output of three-input NAND gate 732, the SR flip-flop 730 is not set, S4 being fixed to a logical "0" and controlled not to be read out.

Figure 11:
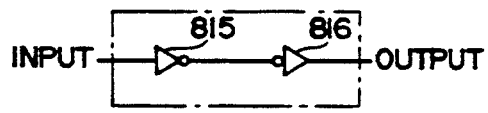
Figure 11:
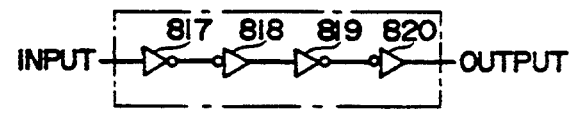

The delay circuit in the respective drawings, as shown in FIGS. 11-(a) and -(b), is a simple delay circuit comprising inverters 815 and 816 or those 817 through 820.

Such the embodiment of the invention is obtainable of the following effects:

(1) the packet assembling mechanism for adding the tag field, such as destination address, in the order to the sequentially input data with no tag is possible and
 (a) an effective data input rate is improved,
 (b) the number of input pins is reduced, and
 (c) an external device for adding the tags or a host processor is not required. Also, (2) since the packet disassembling and rearranging mechanism is provided which once buffers the output packet and then outputs only the data field in the predetermined order,
 (a) the output data stream in the predetermined order is obtained without rearranging the data by use of the external device or the host processor,
 (b) an effective data output rate is improved, and
 (c) the number of output pins is reduced. Furthermore, (3) the embodiment of the data-driven processor of the invention can be seen, as a processor without the tag field, from the exterior, so that it is easy to design the system using thus processor and moreover the quantity of hardware of the system is reducible.

In addition, in the aforesaid embodiment, the tag to be added to the data is shown as the ID number, in other words, the next destination address only, but it is also possible for the generation number to be added to each set of the data in the order of input data.

Also, in the aforesaid embodiment, implementation is shown only by the operable asynchronous circuit without using system clock, but a similar circuit of course can be implemented by a clock synchronous circuit.

Furthermore, in the aforesaid embodiment, the internal construction of data-driven processor conforms to that of the conventional example for simplification of description, but it is apparent that the present invention also is applicable to a usual data-driven information processor.

Also, in the aforesaid embodiment, both the packet dissembling mechanism and packet rearranging mechanism are implemented on the same hardware, but either one only can be implemented, for example, it is possible that only the rearrangement of the packets according to the information of the tag field is implemented so that, when output to the exterior, the data, while having the tag information, is outputted in the predetermined order.

In addition, in the aforesaid embodiment, the packet disassembling and rearranging mechanism includes doublebank two-port HAM, so that the packet output rate is kept at high rate. However, it is obvious that singlebank two-port RAM structure can also be introduced into this kind of processor.

As seen from the above, the data-driven processor of the invention is provided at the input field with the packet assembling mechanism which adds the tag field, such as the destination address, to the data sequentially introduced when the input data has no tag information, whereby untagged data without the tag can be introduced, thereby improving the effective data input rate, reducing the number of input pins and enabling the data field to be introduced without any external device.

Furthermore, together with the packet assembling mechanism, the packet disassembling and rearranging mechanism which is provided at the output unit and, for example, once buffers the output packet stream to output only the data field in the predetermined order, when provided, can obtain the output data stream in the predetermined order and, in the same way as the above, the effective data output rate can be improved and the number of output pins be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed Is:

1. A data-driven processor that processes a set of input data packets received in a predetermined order, and for outputting a set of output data packets, each output packet comprising a result operand and a unique TAG-ID number, with each Unique TAG-ID number indicating the position of said result operand in an ordered sequence of result operands, with the sequence in a predetermined order necessary for a next stage of processing said driven processor comprising:

a packet rearranging unit, coupled to sequentially receive said set of output data packets and having an ordered plurality of storage locations, for storing only the result operand of each received output data packet in a storage location of said ordered plurality indicated by the unique TAG-ID number of the received output data packet so that result operands are stored in the predetermined order regardless of the order of receipt of the output data packets; and a packet output unit, coupled to said packet rearranging unit, for sequentially reading only said result operands, stored by said packet rearranging unit, from said ordered plurality of storage locations to provide said result operands in the predetermined order.

2. A data-driven processor as set forth in claim 1, wherein said TAG-ID number is a destination address information.

3. A data-driven processor as set forth in claim 1, wherein said TAG-ID number is a destination information and a generation information.

4. A data-driven processor as set forth in claim 1, wherein said packet rearranging unit is provided with;

a tag field latch means which latches a distinct TAG-ID number of a given output data packet;

a data field latch means which latches a result operand of said given output data packet;

a two-port RAM bank;

a write-in bank control circuit which writes in said two-port RAM bank the result operand latched at said data field latch means by using said TAG-ID number, latched in said tag field latch means as the address; and a read-out bank control circuit which outputs an ordered sequence of address values, with a position of a particular address value in the ordered sequence determined by the magnitude of the address value, with said sequence of address values used to read out in order result operands written in said two-port RAM bank.

5. A data-driven processor as set forth in claim 4, wherein said TAG-ID number is a destination address information.

6. A data-driven processor as set forth in claim 4, wherein said TAG-ID number is a destination information and a generation information.

7. A data-driven processor as set forth in claim 1, wherein said packet rearranging unit is provided with;

a tag field latch means which latches a distinct TAG-ID number of a given output data packet;

a data field latch means which latches a result operand of said given output data packet;

a two-port RAM bank;

a write-in bank control circuit which writes into said two-port RAM bank the result operand latched at said data field latch means by using said distinct TAG-ID number, latched in said tag field latch means, as an address; and a read-out bank control circuit which reads out said result operands from said two-port RAM bank with sequential addresses, and outputs only result operands in the order of the magnitude of their corresponding distinct TAG-ID numbers.

8. A data-driven processor as set forth in claim 7, wherein said TAG-ID number is a destination address information.

9. A data-driven processor as set forth in claim 7, wherein said TAG-ID number is a destination information and a generation information.

* * * * *